United States Patent
Shi et al.

(10) Patent No.: US 8,504,367 B2
(45) Date of Patent: Aug. 6, 2013

(54) SPEECH RETRIEVAL APPARATUS AND SPEECH RETRIEVAL METHOD

(75) Inventors: Dafei Shi, Beijing (CN); Yaojie Lu, Beijing (CN); Yueyan Yin, Beijing (CN); Jichuan Zheng, Beijing (CN); Lijun Zhao, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 493 days.

(21) Appl. No.: 12/872,291

(22) Filed: Aug. 31, 2010

(65) Prior Publication Data

US 2011/0071833 A1 Mar. 24, 2011

(30) Foreign Application Priority Data

Sep. 22, 2009 (CN) .......................... 2009 1 0176847

(51) Int. Cl.
*G10L 15/04* (2006.01)
*G06F 17/30* (2006.01)

(52) U.S. Cl.
USPC .................................. 704/254; 707/E17.101

(58) Field of Classification Search
USPC ........... 704/231–257; 707/E17.101–E17.103
See application file for complete search history.

(56) References Cited

U.S. PATENT DOCUMENTS

| 7,401,019 | B2 * | 7/2008 | Seide et al. .................. 704/254 |
| 7,542,966 | B2 | 6/2009 | Wolf et al. |
| 7,809,568 | B2 * | 10/2010 | Acero et al. .................. 704/257 |
| 2002/0052870 | A1 * | 5/2002 | Charlesworth et al. ........... 707/3 |
| 2006/0264209 | A1 * | 11/2006 | Atkinson et al. ........... 455/422.1 |
| 2008/0270344 | A1 * | 10/2008 | Yurick et al. ...................... 707/2 |
| 2009/0030680 | A1 * | 1/2009 | Mamou ........................ 704/235 |
| 2009/0132251 | A1 | 5/2009 | Sagawa |
| 2011/0173226 | A1 * | 7/2011 | Saraclar et al. ............... 707/769 |

OTHER PUBLICATIONS

Extended European Search Report issued Jun. 10, 2011, in Patent Application No. 10176975.0.

* cited by examiner

*Primary Examiner* — Samuel G Neway
(74) *Attorney, Agent, or Firm* — Oblon, Spivak, McClelland, Maier & Neustadt, L.L.P.

(57) ABSTRACT

Disclosed are a speech retrieval apparatus and a speech retrieval method for searching, in a speech database, for an audio file matching an input search term by using an acoustic model serialization code, a phonemic code, a sub-word unit, and a speech recognition result of speech. The speech retrieval apparatus comprises a first conversion device, a first division device, a first speech retrieval unit creation device, a second conversion device, a second division device, a second speech retrieval unit creation device, and a matching device. The speech retrieval method comprises a first conversion step, a first division step, a first speech retrieval unit creation step, a second conversion step, a second division step, a second speech retrieval unit creation step, and a matching step.

10 Claims, 4 Drawing Sheets

SPEECH RETRIEVAL APPARATUS AND SPEECH RETRIEVAL METHOD

BACKGROUND OF THE INVENTION

1. Field of the Invention

The present invention relates to a speech retrieval apparatus and a speech retrieval method, and more particularly relates to a speech retrieval apparatus and a speech retrieval method based on a holo-speech search (HSS) for searching, in a speech database, for an audio file matching an input search term with high precision and high recall.

2. Description of the Related Art

In recent years, audio files such as those used for broadcasting, TV, podcasting, audio learning, and voice mailbox can be found everywhere around computers, networks, and everyday life with the further popularization of audio applications. It is getting more difficult to find and locate a desired audio file for a user with the increase of the amount of speech information.

In a conventional text search method, an index file is created for original data so that the appearance position of a search term can be located rapidly. Currently a mainstream method is creating an inverted file table in units of words. Each file is formed by a sequence of words, and a search condition input by a user is generally formed by a few words. As a result, if the appearance positions of these words are recorded in advance, the file containing these words can be found once these words are found in the index file.

In a conventional speech retrieval system, a speech search is carried out by using a speech recognition result and corresponding lattice information, or is carried out only by using the lattice information. In order to increase retrieval speed, the text search method is also used in some conventional speech retrieval systems. However, only a text search term can be generally dealt with in this kind of systems. The significance of the lattice information is as follows. In the field of speech search, only the most preferred result can be obtained by using speech recognition in the usual case. However, it is possible to obtain plural possible speech recognition results in a certain range of confidence if using the lattice information; thus there are more choices. When making a search, it is possible to search for said more choices so that the problems of recognition errors, out-of-vocabulary (OOV) words, etc., can be alleviated to some degree.

OOV means exceeding the scope of a dictionary. An acoustic model and a language model are normally used in the speech recognition; they are mathematical models obtained by training using artificially annotated real language data. If a pronunciation or a word does not appear in the real language data at all, it cannot be recognized when making the speech recognition. This causes an OOV problem. A common OOV problem is mainly concentrated on words of geographical names, personal names, etc.

Some features of the audio file, such as a phonemic code, a sub-word unit, and a speech recognition result, may be considered for the speech search. In general, the corresponding lattice information of the phonemic code, the sub-word unit, and the speech recognition result can be obtained in a recognition process.

A phonemic code is the smallest segmental unit of sound used to form meaningful contrasts between utterances in a language or dialect. A phoneme is a concretely existing physical phenomenon. The International Phonetic Alphabet (IPA) is a meaningful text assembly; details of the IPA include that the phonetic alphabet can be used to represent the sounds of any language. Compared with the means of speech search using the following sub-words unit, the means of speech retrieval using the phonemic code can effectively alleviate the problems of OOV words, insufficient training data, and recognition errors; however, it may bring some noise to the retrieval result.

A sub-word unit is a combination of meaningful phonemic codes in the face of statistics; it is a meaningful text assembly, and coincides with the regular pronunciation habits of human beings. The means of speech search using the sub-word unit can alleviate the problems of OOV words and insufficient training data to some degree. In the aspect of recognition errors, this means is better than the means of speech search using the following speech recognition result, but worse than the means of speech search using the phonemic code. It is possible to alleviate the noise by using this feature. Retrieval precision of using this feature is higher than that of using the phonemic codes, but lower than that of using the following speech recognition result.

A speech recognition result is a character result having a real meaning of language, of the audio file; thus it is human-readable information. The means of speech search using the speech recognition result may cause the problems of OOV words, non-native language, insufficient training data, recognition errors, etc. It is often difficult to solve the above problems if only using this feature. In a case without the appearance of the problems of OOV words, non-native language, insufficient training data, recognition errors, etc., retrieval precision is high. But if the above problems occur, there may not be any retrieval result, or a retrieval error may occur.

Some concepts in the field of speech search are briefly introduced as follows.

(1) Precision and Recall

Precision can be seen as a measure of exactness or fidelity, whereas recall is a measure of completeness. In an information retrieval scenario, precision is defined as the number of relevant objects retrieved by a search divided by the total number of objects retrieved by that search, and recall is defined as the number of relevant objects retrieved by a search divided by the total number of existing relevant objects which should have been retrieved.

(2) Ranking

A retrieval system may return corresponding files only according to a logical relationship between a search term and the files. If it is necessary to further express a deep relationship between the results and the search term, in order to show the result most coincided with a user demand in front, it is also necessary to rank the results by using various data. Currently there are two mainstream techniques for analyzing a correlation between retrieval results and a search term, used for ranking; they are link analysis and calculation based on contents.

(3) Speech Division

It means dividing an audio file into segments which can be indexed.

(4) Speech Data

Data of the bottom layer of both a speech search term and an audio file in a speech database are characters. If the character segments of the search term are the same as the character segments of the audio file, the search term and the audio file are considered matching. Matching is based on a division; sub-word units formed after the division are the character segments. If a character segment, for example, "ABCD" in the sub-word unit dimension of a search term, and a character segment, for example, "ABCD" in the sub-word unit dimension of an audio file, entirely match, the search term and the audio file are considered matching entirely in the sub-word unit dimension. Besides entire matching, there is a fuzzy matching. The fuzzy matching works with matches that may be less than 100% perfect when finding correspondence between two segments. For example, like "ABCD" and "AECD", or "ABCD" and "ABCE", if 75% of characters are the same, they can be considered matching. Matching in the other dimension (for example, the phonemic code or the speech recognition result) is the same; either the entire matching or the fuzzy matching can be used.

In addition, U.S. Pat. No. 7,542,966 discloses a speech retrieval system in which the phonemic code, the sub-word unit and the corresponding lattice information are used. However, the speech recognition result is not used, and only the speech search term can be dealt with.

In all of conventional speech retrieval techniques, various features of speech are not comprehensively used for making a search. Therefore the problems of OOV words, a lot of recognition errors, non-native language, insufficient training data, etc., cannot be overcome; retrieval precision, retrieval speed, and error robustness cannot be improved; and a text search term and a speech search term cannot be dealt with at the same time.

SUMMARY OF THE INVENTION

The disadvantages of the prior art are overcome by the present invention in which a speech retrieval apparatus and a speech retrieval method are provided based on the HSS. The speech retrieval apparatus and the speech retrieval method comprehensively use various features of speech, and use a speech retrieval unit to make a speech search.

According to one aspect of the present invention, the speech retrieval apparatus, which is used for searching, in a speech database, for an audio file matching an input search term, comprises a first conversion device configured to convert the audio file in the speech database into an acoustic model serialization code, a phonemic code, a sub-word unit, and a speech recognition result; a first division device configured to divide the acoustic model serialization code, the phonemic code, the sub-word unit, and the speech recognition result converted by the first conversion device; a first speech retrieval unit creation device configured to create a first speech retrieval unit by using the acoustic model serialization code, the phonemic code, the sub-word unit, and the speech recognition result divided by the first division device as elements; a second conversion device configured to convert the input search term into an acoustic model serialization code, a phonemic code, a sub-word unit, and a speech recognition result; a second division device configured to divide the acoustic model serialization code, the phonemic code, the sub-word unit, and the speech recognition result converted by the second conversion device; a second speech retrieval unit creation device configured to create a second speech retrieval unit by using the acoustic model serialization code, the phonemic code, the sub-word unit, and the speech recognition result divided by the second division device as elements; a matching device configured to match the first speech retrieval unit and the second speech retrieval unit so as to determine a matching degree between the search term and the audio file, and determine a matching result according to the matching degree.

According to another aspect of the present invention, the speech retrieval method, which is used for searching, in a speech database, for an audio file matching an input search term, comprises a first conversion step for converting the audio file in the speech database into an acoustic model serialization code, a phonemic code, a sub-word unit, and a speech recognition result; a first division step for dividing the acoustic model serialization code, the phonemic code, the sub-word unit, and the speech recognition result converted by the first conversion step; a first speech retrieval unit creation step for creating a first speech retrieval unit by using the acoustic model serialization code, the phonemic code, the sub-word unit, and the speech recognition result divided by the first division step as elements; a second conversion step for converting the input search term into an acoustic model serialization code, a phonemic code, a sub-word unit, and a speech recognition result; a second division step for dividing the acoustic model serialization code, the phonemic code, the sub-word unit, and the speech recognition result converted by the second conversion step; a second speech retrieval unit creation step for creating a second speech retrieval unit by using the acoustic model serialization code, the phonemic code, the sub-word unit, and the speech recognition result divided by the second division device as elements; a matching step for matching the first speech retrieval unit and the second speech retrieval unit so as to determine a matching degree between the search term and the audio file, and determine a matching result according to the matching degree.

According to the embodiments of the present invention, various features of speech are sufficiently used, and the speech retrieval unit is used for the speech search. Therefore retrieval precision and retrieval speed are increased at the same time, and error robustness and speech recognition accuracy are improved too.

DETAILED DESCRIPTION OF THE PREFERRED EMBODIMENTS

Figure 1:
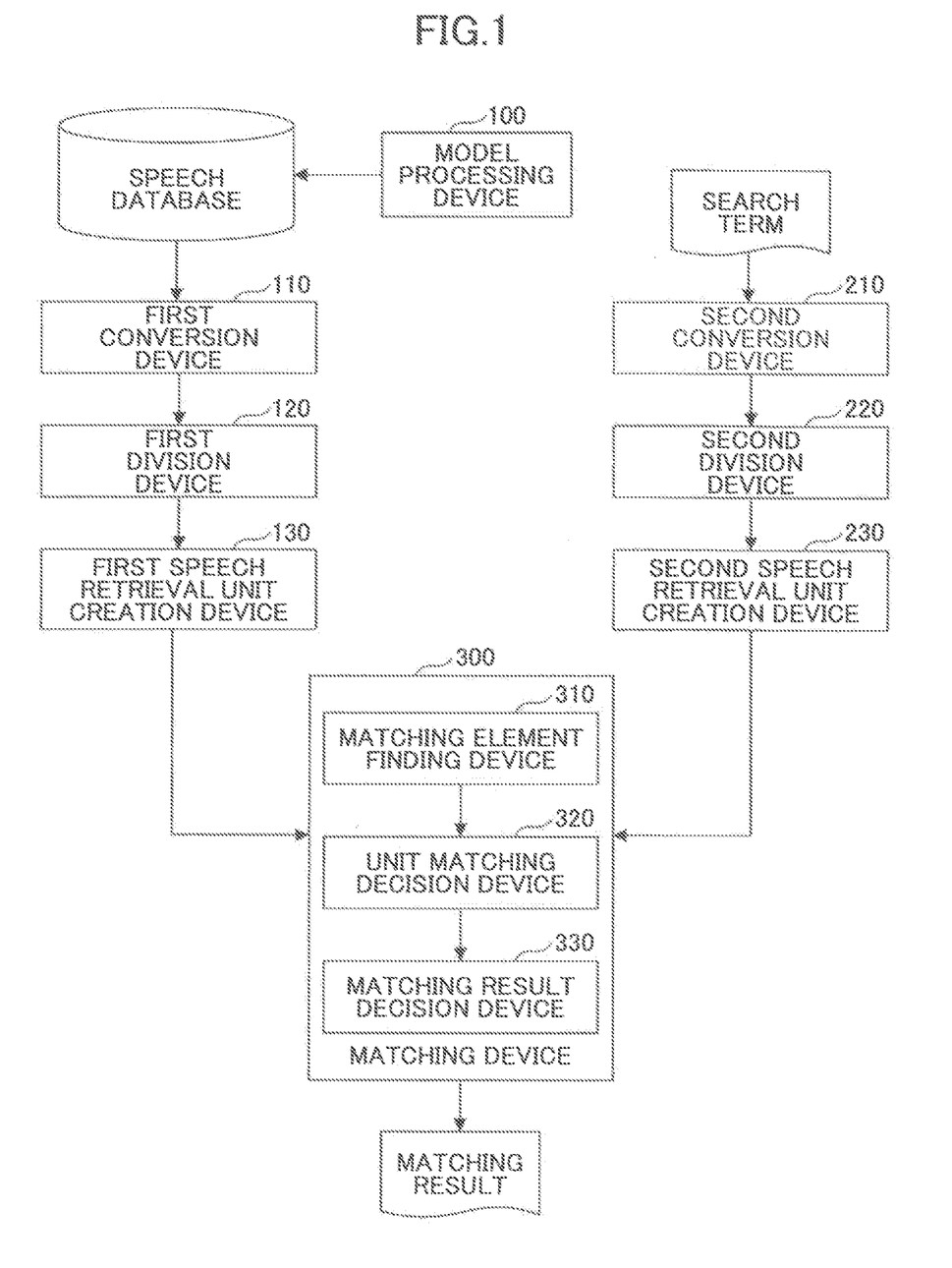
FIG. 1 is a block diagram of a speech retrieval apparatus according to an embodiment of the present invention.

FIG. 1 is a block diagram of a speech retrieval apparatus according to an embodiment of the present invention.

The speech retrieval apparatus according to the embodiment of the present invention is used for searching, in a speech file database, for an audio file matching an input search term. The speech file database, also called the speech database, is, for example, a computer hard disk or a database, or may be obtained through a network such as a local area network or the Internet.

The speech retrieval apparatus comprises a first conversion device 110, a first division device 120, a first speech retrieval unit creation device 130, a second conversion device 210, a second division device 220, a second speech retrieval unit creation device 230, and a matching device 300. The first conversion device 110 is used for converting the audio file in the speech database into an acoustic model serialization code, a phonemic code, a sub-word unit, and a speech recognition result. The first division device 120 is used for dividing the acoustic model serialization code, the phonemic code, the sub-word unit, and the speech recognition result converted by the first conversion device 110. The first speech retrieval unit creation device 130 is used for creating a first speech retrieval unit by employing the acoustic model serialization code, the phonemic code, the sub-word unit, and the speech recognition result divided by the first division device 120 as elements.

The second conversion device 210 is used for converting the input search term into an acoustic model serialization code, a phonemic code, a sub-word unit, and a speech recognition result. The second division device 220 is used for dividing the acoustic model serialization code, the phonemic code, the sub-word unit, and the speech recognition result converted by the first conversion device 210. The second speech retrieval unit creation device 230 is used for creating a second speech retrieval unit by employing the acoustic model serialization code, the phonemic code, the sub-word unit, and the speech recognition result divided by the second division device 220 as elements. The matching device 300 is used for matching the first speech retrieval unit and the second speech retrieval unit so as to determine a matching degree between the first speech retrieval unit and the second speech retrieval unit, and determine a matching result according to the matching degree.

The conversion process of the audio file in the speech database and the input search term, carried out by the first conversion device 110 and the second conversion device 210, respectively, may be executed according to the same conversion method, for example, the same speech recognition method and vector quantization method. Here, the first conversion device 110 and the second conversion device 210 may be considered as a logical division when the same conversion device carries out the same process of feature extraction with regard to different objects (for example, the audio file and the input search term).

Similarly, the division process of the acoustic model serialization code, the phonemic code, the sub-word unit, and the speech recognition result converted by the first conversion device 110 and the second conversion device 210, respectively, may be executed according to the same division method, for example, the same equal-time division method, the same speech energy method, or the same vowel-consonant division method. Here, the first division device 120 and the second division device 220 may be considered as a logical division when the same division device carries out the same division process with regard to different objects (for example, a feature element converted from the audio file and a feature element converted from the input search term).

The first speech retrieval unit creation device 130 and the second speech retrieval unit creation device 230 may create the first speech retrieval unit and the second speech retrieval unit, respectively, according to the same creation method. For example, in respective speech retrieval units, elements having the same type can be added into the corresponding positions according to the same sequence of a feature element; the same sequence of a feature element is, for example, a sequence of the acoustic model serialization code, the phonemic code, the sub-word unit, or the speech recognition result so that the matching operation of the two in the below-mentioned matching process can be easily executed. Here, the first speech retrieval unit creation device 130 and the second speech retrieval unit creation device 230 can be considered as a logical division when the same speech retrieval unit creation device carries out the same speech retrieval unit creation process with regard to different objects.

Context information may be further included in the first speech retrieval unit and the second speech retrieval unit. Based on the below description, a division and an addition into the speech retrieval unit, of the context information, depend on a division status of other feature elements such as the acoustic model serialization code, the phonemic code, the sub-word unit, and the speech recognition result, and do not affect the division of the other feature elements. Therefore the context information does not affect a matching possibility between the first speech retrieval unit and the second speech retrieval unit.

In the embodiment of the present invention, the acoustic model serialization code is used for the speech search. The acoustic model serialization code is a searchable text obtained by serializing mel-frequency cepstrum coefficients (MFCC) with a vector quantization technique. The means for the speech search using the acoustic model serialization code cannot cause the problems of OOV words, non-native language, insufficient training data, recognition errors, etc.; however, more noise may occur in retrieval results so that retrieval accuracy may be low. In other words, in the aspect of retrieval accuracy, this means is worse than the means for the speech search using the phonemic code.

The first conversion device 110 extracts the acoustic model serialization code, the phonemic code, the sub-word unit, and the speech recognition result from the audio file using various conventional speech recognition techniques and vector quantization techniques to achieve the conversion of the audio file. The second conversion device 210 carries out the same process with regard to the input search term. Thus various features of speech can be obtained. It is noted that the acoustic model serialization code, the phonemic code, and the sub-word unit are searchable but unreadable code, but the speech recognition result is a readable and searchable text.

In the embodiment of the present invention, either the first speech retrieval unit or the second speech retrieval unit is a speech retrieval unit which includes a data structure of various features of speech, i.e. a data storage structure for storing the acoustic model serialization code, the phonemic code, the sub-word code, and the speech recognition result, or may further include the context information as a feature of speech. The speech retrieval unit may further include time information corresponding to each feature of speech. The speech retrieval unit is used as an organization unit in the retrieval process of the embodiment. It is noted that the time information means that when the audio file is replayed to a certain point in time, the corresponding acoustic model serialization code, the phonemic code, the sub-word unit, or the speech recognition result appears.

As a data structure, of course, details of the speech retrieval unit are not closed and fixed. That means the speech retrieval unit can be extended to include more feature elements according to an actual situation. For example, if the audio file has context information i.e. the part of a discourse surrounding a word or passage that helps make its meaning clear, the speech retrieval unit may further include the context information as a feature element. In addition, the speech retrieval unit may further include the time information corresponding to each feature of speech.

In a case where the audio file includes the context information, it is not necessary to let the first conversion device 110 carry out the extraction. In this case, it is possible to directly divide, by the first division device 120, the context information included in the audio file, and the first speech retrieval unit creation device 130 lets the divided context information be an element of the first speech retrieval unit.

However, as for the input search term, since it does not have corresponding context information, the context information of the input search term is replaced by the speech recognition result. The second speech retrieval unit creation device 230 lets the speech recognition result divided by the second division device 220 be an element of the second speech retrieval unit.

The time information corresponding to the acoustic model serialization code, the phonemic code, the sub-word unit, and the speech recognition result can be obtained while the first conversion device 110 converts the audio file in the speech database into the acoustic model serialization code, the phonemic code, the sub-word unit, and the speech recognition result. In this case, the first speech retrieval unit creation device 130 can add the corresponding time information into the first speech retrieval unit as the related information of the various elements in the first speech retrieval unit. In addition, when outputting a matching result, the matching device 300 can add the corresponding time information into the matching result and output it.

The first division device 120 divides the acoustic model serialization code, the phonemic code, the sub-word unit, and the speech recognition result converted by the first conversion device 110 according to the equal-time division method, the speech energy division method, or the vowel-consonant division method. The second division device 220 divides the acoustic model serialization code, the phonemic code, the sub-word unit, and the speech recognition result converted by the second conversion device 210 according to the equal-time division method, the speech energy division method, or the vowel-consonant division method.

In a case where the equal-time method is selected, it is supposed that a time constant TL is used as a division unit, and another time constant OTL is used as a division overlap time. In general, the length of TL should be longer than the pronunciation time of one word. TL may be, for example, 5 seconds. Of course, TL may be 3 seconds or 9 seconds too. The length of OTL should be shorter than TL/2. If TL is 5 seconds, OTL may be, for example, 1 second. In this case, of course, OTL may be, for example, 2 seconds or 0.5 seconds too. Speech is divided by using TL and OTL.

It is supposed that the length of the speech is T. The first division segment is from 0 seconds to the minimum one of TL and T. If T and TL are determined, this division is fixed.

The starting time of the following division segment is Sn=Tps+TL−OTL wherein Tps is the ending time of the last division segment, and the ending time is Min(Sn+TL, T) i.e. the minimum one of Sn+Tl and T.

The context information may be a Word file, a PPT file, or artificially annotated information related to the audio file. In general, the context information does not have fine granularity and accurate time information. The context information can be divided according to an event time; the event is, for example, a page skip event of a PPT file, a mouse click event, etc. Alternatively, the context information can be divided according to the time information in the artificially annotated information. Then the divided context information may be added into the first speech retrieval unit corresponding to the time information. If this kind of information cannot be obtained or does not exist, the entire context information can be associated with all time periods of the audio file, i.e. the entire context information is added into all of the first speech retrieval units of the audio file.

That is, the first division device 120 determines the time information corresponding to the context information by using the event time or the annotated time included in the context information. If the context information does not have the event time or the annotated time, the context information corresponds to all the time information of speech. The context information is divided according to the time information corresponding to the context information.

The first speech retrieval unit creation device 130 and the second speech retrieval unit creation device 230 create their own corresponding speech retrieval units, and add the divided acoustic model serialization code, phonemic code, sub-word unit, and speech recognition result into the speech retrieval units as elements. If the context information exists, the context information will be added into the speech retrieval units as an element too. If the time information of speech is necessary, the time information of speech, together with the corresponding element, will be added into the speech retrieval units.

Figure 2:
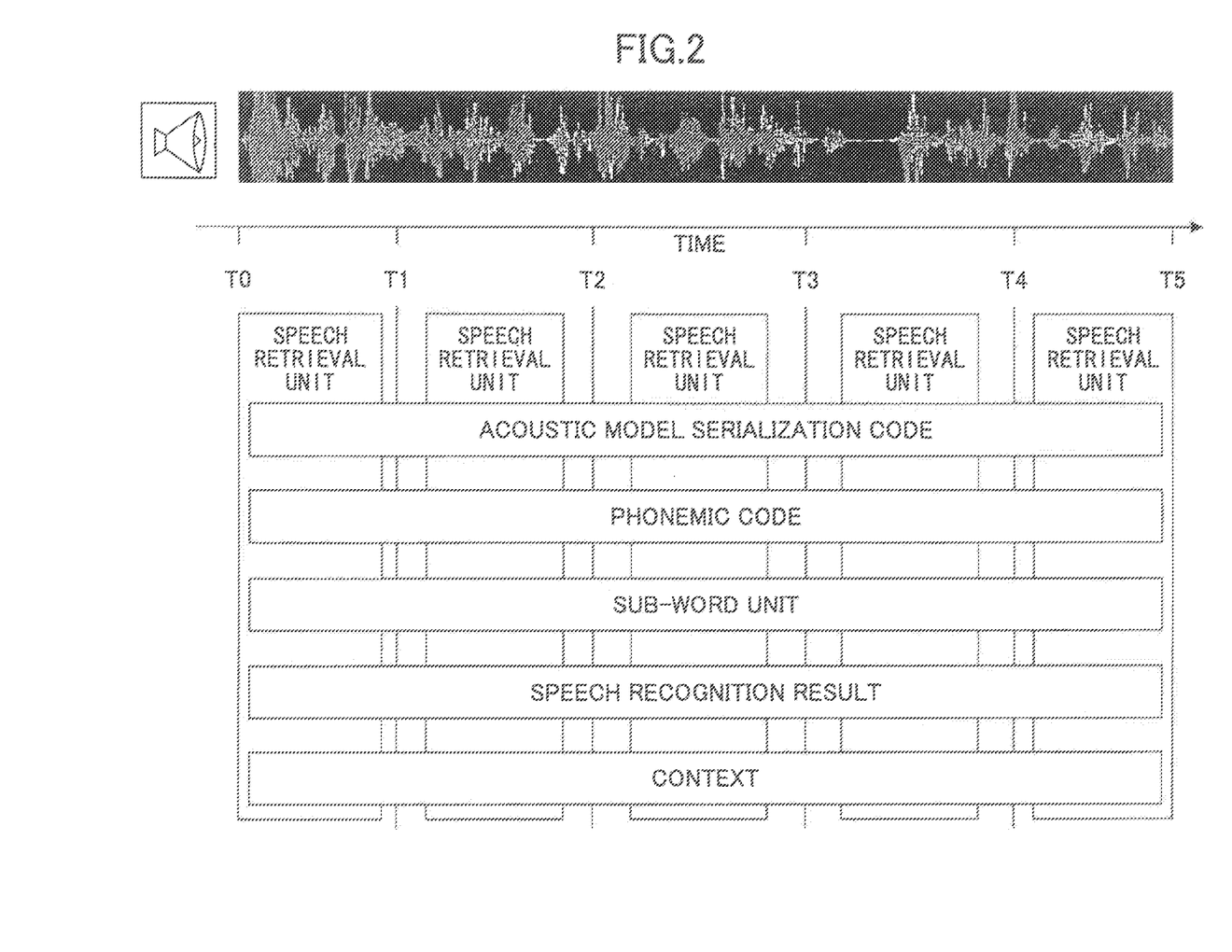
FIG. 2 illustrates speech retrieval units divided according to an equal-time division method.
Figure 3:
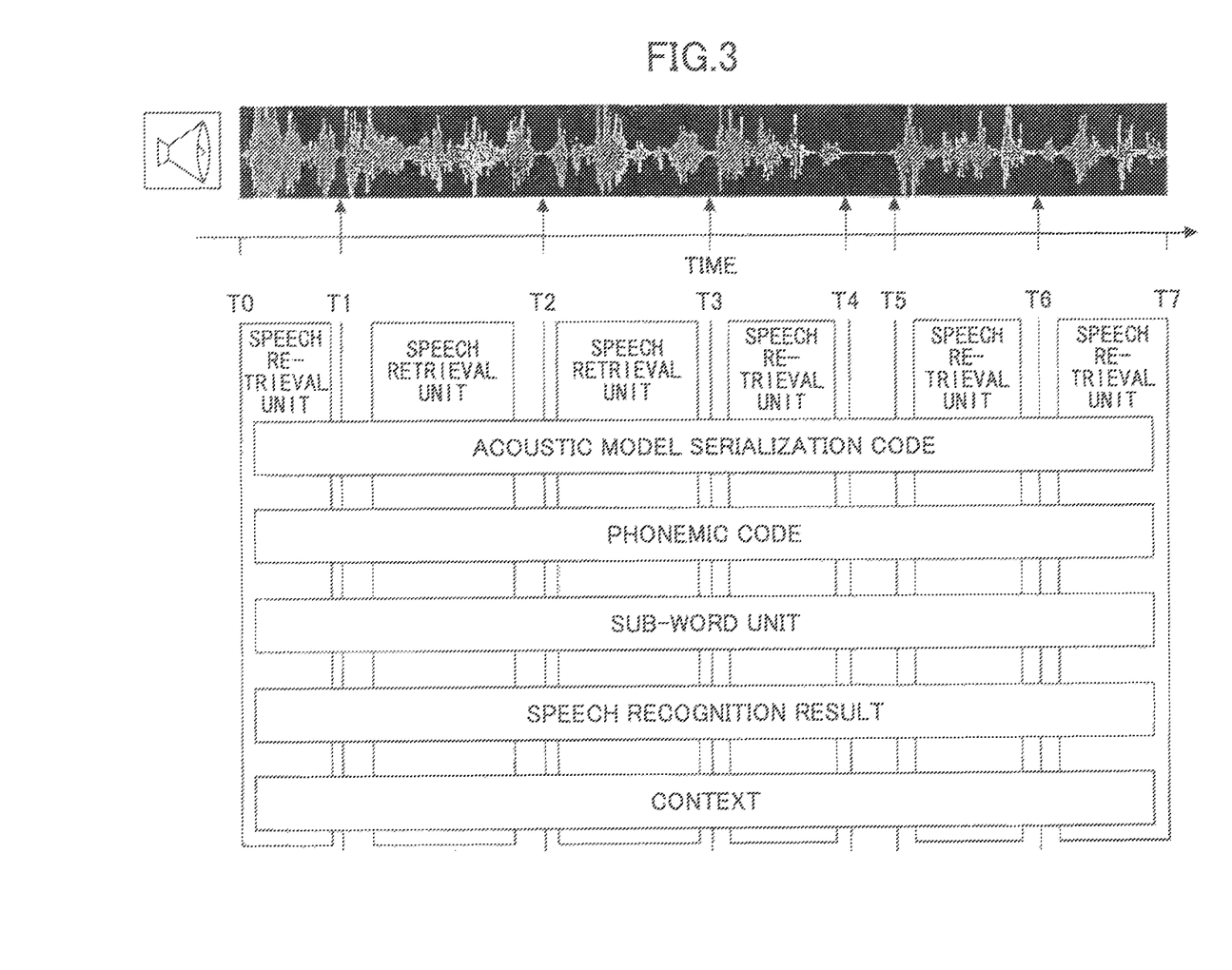
FIG. 3 illustrates speech retrieval units divided according to a speech energy division method.

FIG. 2 illustrates speech retrieval units divided according to an equal-time division method; FIG. 3 illustrates speech retrieval units divided according to a speech energy division method.

In FIG. 2 and FIG. 3, for example, as for the audio file shown at the top, two division methods are used. In FIG. 2, the audio file is equally divided into 5 parts by using time-points T0~T5 so that the audio file is divided into 5 speech retrieval units. However, in FIG. 3, the audio file is divided into 7 parts by using time-points T0~T7 where the speech energy is weakest. In FIG. 3, since there is not speech energy between T4 and T5, it is concluded that there is not speech between T4 and T5. Therefore the audio file is divided into 6 speech retrieval units in FIG. 3. Obviously, each audio file can also be divided into plural speech retrieval units having other numbers (for example, 4 or 8 speech retrieval units) according to an actual situation.

In FIG. 2 and FIG. 3, it is supposed that there is context information and the context information is considered. In this case, five features including the acoustic model serialization code, the phonemic code, the sub-word unit, the speech recognition result and the context information are extracted out as elements, i.e. each speech retrieval unit is a 5-dimension one. In addition, it can be found that each speech retrieval unit has the time information so that it is easy to determine a position of a matching result according to the time information.

Before introducing how to match, some processing methods of the speech database and the input search term are introduced first.

For example, as for the speech database, the audio file in the speech database can be processed by using the model processing device 100 with different acoustic models and language models so that the speech features such as the acoustic model serialization code, the phonemic code, the sub-word unit, and the speech recognition result can be further sufficiently utilized. Therefore defects such as the problems of language-dependence, insufficient training data, and OOV words caused by using a single model, can be overcome more effectively.

Take English language for instance; an acoustic model of English language is a training model of English pronunciations and physical features, and a language model of English language is a training model of meanings and grammar of English texts. Similarly, an acoustic model and a language model of Chinese language are the same.

The phonemic code, the sub-word unit, and the speech recognition result of the audio file are extracted by using the acoustic model and the language model. In the embodiment of the present invention, two or more kinds of the acoustic models and the language models are used to process the audio file in the speech database. Thus, for example, when processing English speech, the acoustic model and the language model of the English language are selected, and when processing Chinese speech, the acoustic model and the language model of the Chinese language are selected.

In some cases, an audio file includes a few languages such English and Chinese. The embodiment of the present invention can deal with these cases effectively. To deal with this kind of problem, the next construction method is used when constructing the speech retrieval unit. The construction method is "speech retrieval unit"={the acoustic model serialization code, the phonemic code of English, the phonemic code of Chinese, the sub-word unit of English, the sub-word unit of Chinese, the speech recognition result of English, the speech recognition result of Chinese, the context information}.

In such a way, two models can be simultaneously used for dealing with the speech. Since the retrieval in the embodiment of the present invention may be extended, the speech retrieval unit changed from 5 dimensions to 8 dimensions does not affect the subsequent process. In the same way, other similar extensions may be carried out too.

In the aspect of a search term, as for a text search term, it can be converted into a speech search term by using a conventional text-to-speech conversion technique such as TTS (Text To Speech) technique; however, as for a speech search term, it is not necessary to be processed. In other words, in the case where the search term is a text search term, the second conversion device 210 converts the text search term into a speech search term. Then the features such as the acoustic model serialization code, the phonemic code, the sub-word unit, and the speech recognition results can be obtained by using a speech recognition technique. It is noted that the TTS technique in this field can convert text into audio by using a speech synthesis method and a statistical method.

Next, a matching process in the embodiment of the present invention is introduced.

In the embodiment of the present invention, the matching device 300 indexes the feature elements such as the acoustic model serialization code, the phonemic code, the sub-word unit, the speech recognition result, and other probably existing context information in the first and second speech retrieval units, respectively. In the obtained index, time information of speech corresponding to various element of the speech retrieval unit may also be included. The acoustic model serialization code, the phonemic code, the sub-word unit, the speech recognition result, and the context information can be respectively indexed by a method similar to a text indexing method. The difference between this method and the text indexing method is that the corresponding times may also be recorded in the index.

The matching device 300 may comprise a matching element finding device 310, a unit matching decision device 320, and a matching result decision device 330. The matching element finding device 310 is used for finding matching elements in the first speech retrieval unit of the audio file in the speech database with regard to the various elements in the second speech retrieval unit, respectively. The unit matching decision device 320 is used for determining a unit matching result between the first speech retrieval unit and the second speech retrieval unit according to the matching elements in the first speech retrieval unit and the second speech retrieval unit as well as the weights of the matching elements. The matching result decision device 330 is used for deciding a matching degree between the search term and the audio file according to the unit matching results between all of the second speech retrieval units of the search term and all of the first speech retrieval units of the audio file, determining whether the search term and the audio file match according to the matching degree, and letting the matching audio file in the speech database be the matching result.

It is obvious that the above matching process carried out between the first speech retrieval unit and the second speech retrieval unit is a multi-dimension one. In each dimension, there is a matching or mismatching status; the matching status in each dimension can correspondingly contribute to the matching status between the speech retrieval unit of the search term and the speech retrieval unit of the audio file.

For example, the matching in each dimension may have a weight W contributing to the unit matching, and W may be defined as follows.

$$W_{CD} > W_W > W_{SW} > W_{PC} > W_{AFC}$$

Here, $_{CD}$ stands for the context information, $_W$ stands for the speech recognition result, $_{SW}$ stands for the sub-word unit, $_{PC}$ stands for the phonemic code, and $_{AFC}$ stands for the acoustic model serialization code.

It is obvious that the definition of the weight is not limited as above; it may be various according to an actual situation.

The final decision, of whether the search term and the audio file match, depends on whether the matching degree, between all of the speech retrieval units of the search term and all of the speech retrieval units of the audio file, satisfies a predetermined threshold condition (for example, the matching degree is greater than or equal to a predetermined threshold value). If the sum of the weights of the unit matching degree between the second speech retrieval unit of the search term and the respective first speech retrieval unit of the audio file satisfies the predetermined threshold condition, it is considered that the search term and the audio file match.

Figure 4:
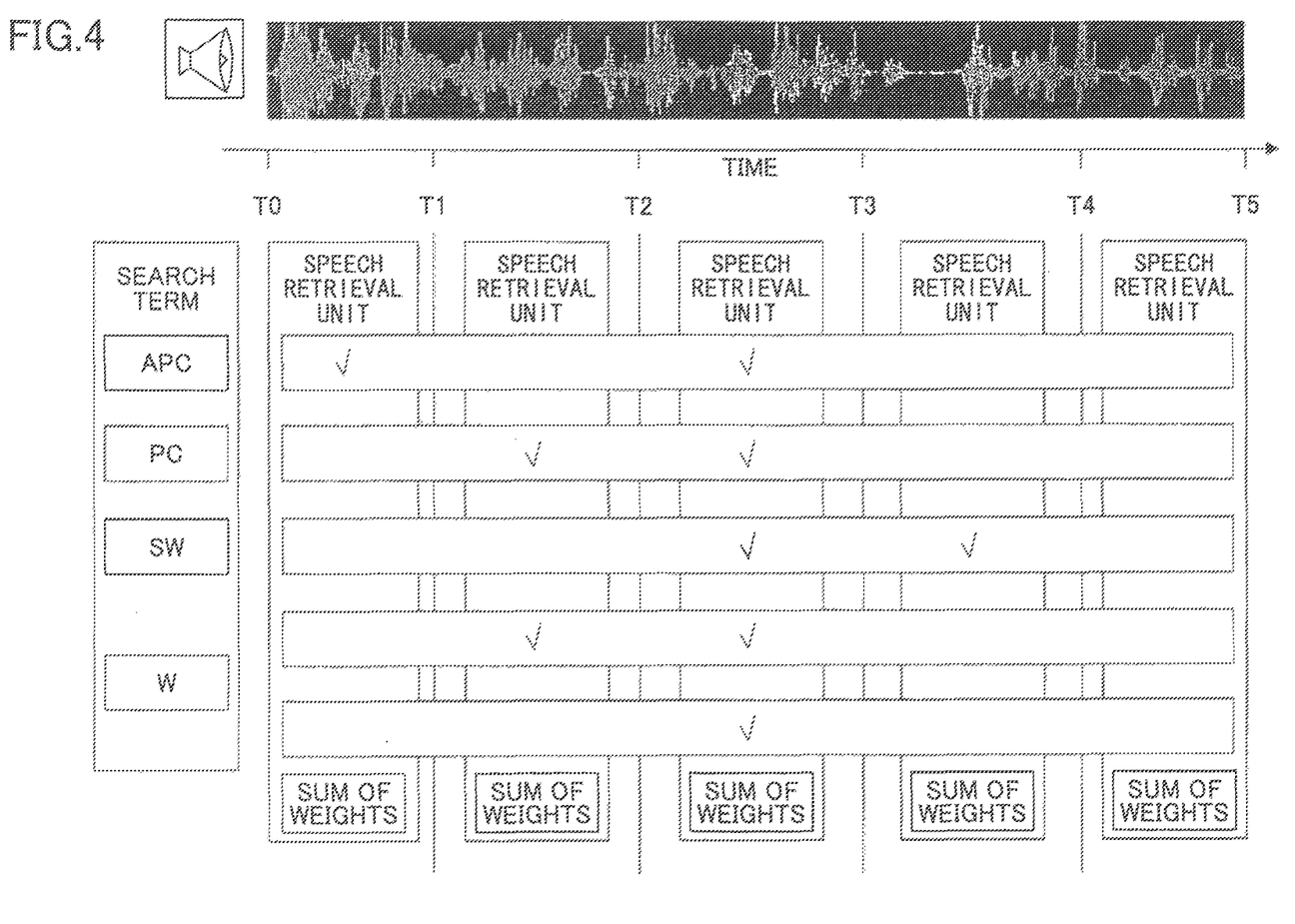
FIG. 4 illustrates a unit matching status of speech retrieval units.

FIG. 4 illustrates a unit matching status of speech retrieval units.

AFC, PC, SW, and W stand for the acoustic model serialization code, the phonemic code, the sub-word unit, and the speech recognition result extracted from the search term by a speech recognition technique, respectively; the context information is replaced by the speech recognition result. FIG. 4 illustrates that the search term includes 5 second speech retrieval units. The matching unit finding device 310 found, according to an index, the elements of the first speech retrieval units of an audio file; these elements corresponds to the elements of the second speech retrieval units, like the elements shown in the spaces indicated by "✓". Here, for example, it is supposed that the weight in each dimension is 1, and if two or more elements match, then speech retrieval units are considered as matching. As shown in FIG. 4, the unit matching decision device 320 determined that the matching speech retrieval units of the audio file and the search term are the speech retrieval units corresponding to (T1~T2) and (T2~T3).

The matching result decision device 330 determines the matching degree between the search term and the audio file according to the matching status between the second speech retrieval unit and the first speech retrieval unit, and determines, according to the matching degree, whether the search term and the audio file match. In addition, the matching result decision device 330 can also rank and output the matching results according to the matching degree. In a case where time information of speech is recorded in the speech retrieval unit, the time period matching the input search term can be conveniently located in the obtained audio file.

The matching degree can be determined by many approaches.

First, a matching frequency SSF on the level of the speech retrieval unit, between a search term Q and an audio file S, is calculated by the following formula (1).

$$SSF(S, Q) = \frac{m}{Sn} \qquad (1)$$

Here, m stands for the number of the first speech retrieval units of the audio file, matching the second speech retrieval unit of the search term Q, and Sn stands for the total number of the first speech retrieval units divided in the audio file.

Next, an inverted matching frequency ISSOF on the level of the speech retrieval unit, of all audio files in the speech database with regard to the search term Q, is calculated by the following formula (2).

$$ISSOF(Q) = \log\frac{N - p(Q) + 0.5}{p(Q) + 0.5} \quad (2)$$

Here, N stands for the total number of the all audio files in the speech database, and p(Q) stands for the total number of the audio files in the speech database, matching the search term Q.

Then a score of an audio file S with regard to the search term Q is calculated by the following formula (3).

$$SCORE(S, Q) = ISSOF(Q) \cdot \frac{SSF(S, Q) \cdot (k_1 + 1)}{SSF(S, Q) + k_1\left(1 - b + b \cdot \frac{Sn}{avgSl}\right)} \quad (3)$$

Here, Sn stands for the number of the first speech retrieval units of the audio file S, and avgSl stands for the average number of the speech retrieval units of all audio files in the speech database.

$K_1$ and b are empirical values; for example, $k_1$=2.0, and b=0.75·ISSOF(Q). It is noted that $K_1$ and b are not limited to these values. For example, it is also possible that $k_1$=1.5 or $k_1$=2.5, and b=0.50·ISSOF(Q) or b=1·ISSOF(Q).

A result list of the retrieval of this time is obtained by ranking, according to the SCORE(S, Q), all the audio files matching the input search term.

The above approach is derived from a BM25 text search method; however, other methods such as a Boolean search, a vector space model, and a fuzzy search can also be used.

For example, in a case of using a Boolean search, the SCORE(S, Q) of an audio file with regard to the search term Q can be calculated by the following formula (4).

$$SCORE(S, Q) = \begin{cases} 1, & \text{condition1} \\ 0, & \text{condition0} \end{cases} \quad (4)$$

Here, condition1 stands for "in a case where there is a speech retrieval unit in Q matching a speech retrieval unit in S"; condition0 stands for "in other cases".

Again, for example, in a case of using a vector space model, if a collection of the all speech retrieval units of the all audio files in the speech database is called a speech retrieval unit dictionary, the speech retrieval unit dictionary can be expressed as the following formula (5).

$$\Sigma = \{SS_1, SS_2, \ldots, SS_n\} \quad (5)$$

The speech retrieval unit dictionary can be looked at as a vector space; thus it is possible to convert the search term Q into a vector $\overline{Q}$ of the vector space. Similarly, an audio file S can be converted into a vector $\overline{S}$ of the vector space too. Then the SCORE(S, Q) of an audio file S with regard to the search term Q can be calculated by the following formula (6).

$$SCORE(S, Q) = \frac{\overline{Q} \cdot \overline{S}}{|\overline{Q}| \times |\overline{S}|} \quad (6)$$

Here, "·" stands for the inner product of vectors, "×" stands for the outer product of vectors, and "| |" stands for the norm of a vector.

Next, the speech retrieval unit dictionary $\Sigma=\{SS_1, SS_2, \ldots, SS_n\}$ is introduced. If it is supposed that there are 3 audio files S1, S2, S3 in the speech database, S1 is divided into 3 first speech retrieval units $\{SS_1, SS_2, SS_3\}$, S2 is divided into 3 first speech retrieval units $\{SS_2, SS_4, SS_5\}$, S3 is divided into 4 first speech retrieval units $\{SS_1, SS_4, SS_5, SS_6\}$, and the search term Q is divided into 3 second speech retrieval units $\{SS_2, SS_4, SS_6\}$, then $\Sigma$=S1∪S2∪S3=$\{SS_1, SS_2, SS_3, SS_4, SS_5, SS_6\}$. That is, the entire speech database is 6-dimension space.

The vectorized result of S1 is $\{1, 1, 1, 0, 0, 0\}$, the vectorized result of S2 is $\{0, 1, 0, 1, 1, 0\}$, the vectorized result of S3 is $\{1, 0, 0, 1, 1, 1\}$, and the vectorized result of Q is $\{0, 1, 0, 1, 0, 1\}$.

Thus the SCORE($S_1$, Q) of S1, the SCORE($S_2$, Q) of S2, and the SCORE($S_3$, Q) of S3 can be calculated by the above formula (6). The smaller the value of the score is, the higher the matching degree is. The above formula (6) calculates the value of cosine of the angle between the two vector $\overline{S}$ and $\overline{Q}$. This value is in the range of 0~1. 0 stands for the angle being 0 degrees, i.e. very similar. 1 stands for the angle being 90 degrees, i.e. not related at all.

In a case where the input search term is a text search term, the text search term can be divided into a few sub search terms; then the sub search terms are converted into speech search terms. In this case, the process of the embodiment can be applied to the respective speech search terms converted from the sub search terms; then the sum of the scores of the speech search terms converted from the sub search terms are calculated. The sum of the scores is used as the score of an audio file with regard to the original text search term, and can be used for ranking. The process of dividing the text search term into the sub search terms can be done by various conventional techniques. For example, as for the languages such as English and French, the division process can be done according to an input space; as for the language such as Chinese and Japanese, the division process can be done according to a statistical rule or a grammar rule. In a case where the search term is a speech search term, in general, it is not necessary to divide the speech search term.

The present invention also provides a speech retrieval method, which is used for searching, in a speech database, for an audio file matching an input search term, comprises a first conversion step, a first division step, a first speech retrieval unit creation step, a second conversion step, a second division step, a second speech retrieval unit creation step, and a matching step. The first conversion step is carried out by the first conversion device 110, and is used for converting an audio file in a speech database into an acoustic model serialization code, a phonemic code, a sub-word unit, and a speech recognition result. The first division step is carried out by the first division device 120, and is used for dividing the acoustic model serialization code, the phonemic code, the sub-word unit, and the speech recognition result converted by the first conversion step. The first speech retrieval unit creation step is carried out by the first speech retrieval unit creation device 130, and is used for creating a first speech retrieval unit by employing the acoustic model serialization code, the phonemic code, the sub-word unit, and the speech recognition result as elements. The second conversion step is carried out by the second conversion device 210, and is used for converting an input search term into an acoustic model serialization code, a phonemic code, a sub-word unit, and a speech recognition result. The second division step is carried out by the second division device 220, and is used for dividing the acoustic model serialization code, the phonemic code, the sub-word unit, and the speech recognition result converted by the second conversion step. The second speech retrieval unit creation step is carried out by the second speech retrieval unit creation device 230, and is used for creating a second speech retrieval unit by employing the acoustic model serialization code, the phonemic code, the sub-word unit, and the speech recognition result as elements. The matching step is carried out by the matching device 300, and is used for matching the first speech retrieval unit and the second retrieval unit so as to determine a matching degree between the search term and the audio file, and determine a matching result according to the matching degree.

In the first division step, context information included in the audio file is divided too; in the first speech retrieval unit creation step, the divided context information is used as an element of the first speech retrieval unit. In the second speech retrieval unit creation step, the speech recognition result divided by the second division step is used as context information, and this context information is used as an element of the second speech retrieval unit.

In the first conversion step, when the audio file is converted into the acoustic model serialization code, the phonemic code, the sub-word unit, and the speech recognition result, time information of speech corresponding to the acoustic model serialization code, the phonemic code, the sub-word unit, and the speech recognition result is obtained at the same time. In the first speech retrieval unit creation step, the corresponding time information of speech is added into the first speech retrieval unit as related information of the various elements in the first speech retrieval unit. In the matching step, the corresponding time information of speech is added into the matching result; then the matching result including the corresponding time information of speech is output.

In addition, in the matching step, the matching result is further ranked according to the matching degree; then the ranked matching result is output.

By the way, a model processing step may be included too; it is carried out by the model processing device 100. In the model processing step, various acoustic models and language models can be used for dealing with the audio file in the speech database.

In the first division step, time information of speech corresponding to the context information is determined according to an event time or an annotated time included in the context information. If the event time and the annotated time are not in the context information, let the context information correspond to all time information of speech.

In a case where the search term is a text search term, in the second conversion step, the text search term is converted into a speech search term.

In the first division step, the acoustic model serialization code, the phonemic code, the sub-word unit, and the speech recognition result converted by the first conversion step are divided according to an equal-time division method, a speech energy division method, or a vowel-consonant division method. In the second division step, the phonemic code, the sub-word unit, and the speech recognition result converted by the second conversion step are divided according to the equal-time division method, the speech energy division method, or the vowel-consonant division method.

The matching step comprises a matching element finding step, a unit matching decision step, and a matching result decision step. The matching element finding step is carried out by the matching element finding device 310, and used for finding a matching result in the first speech retrieval unit of the audio file in the speech database with regard to the respective elements in the second speech retrieval unit. The unit matching decision step is carried out by the unit matching decision device 320, and is used for determining a unit matching status between the first speech retrieval unit and the second speech retrieval unit according to the matching elements and the weights of the matching elements in the first speech retrieval unit and the second speech retrieval unit. The matching result decision step is carried out by the matching result decision device 330, and is used for determining a matching degree between the search term and the audio file according to the unit matching status between all of the second speech retrieval units of the search term and all of the first speech retrieval units of the audio file, determining a matching status between the search term and the audio file according to the matching degree, and employing the matching audio file in the speech database as a matching result.

A series of operations described in this specification can be executed by hardware, software, or a combination of hardware and software. When the operations are executed by software, a computer program can be installed in a dedicated built-in storage device of a computer so that the computer can execute the computer program. Alternatively, the computer program can be installed in a common computer by which various types of processes can be executed so that the common computer can execute the computer program.

For example, the computer program may be stored in a recording medium such as a hard disk or a ROM in advance. Alternatively, the computer program may be temporarily or permanently stored (or recorded) in a movable recording medium such as a floppy disk, a CD-ROM, a MO disk, a DVD, a magic disk, or a semiconductor storage device.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

The present application is based on Chinese Priority Patent Application No. 200910176847.4 filed on Sep. 22, 2009, the entire contents of which are hereby incorporated by reference.

What is claimed is:

1. A speech retrieval apparatus for searching, in a speech database, for an audio file matching an input search term, comprising:
a first conversion device configured to convert the audio file in the speech database into an acoustic model serialization code, a phonemic code, a sub-word unit, and a speech recognition result;
a first division device configured to divide the acoustic model serialization code, the phonemic code, the sub-word unit, and the speech recognition result converted by the first conversion device;
a first speech retrieval unit creation device configured to create a first speech retrieval unit by using the acoustic model serialization code, the phonemic code, the sub-word unit, and the speech recognition result divided by the first division device as elements;

a second conversion device configured to convert the input search term into an acoustic model serialization code, a phonemic code, a sub-word unit, and a speech recognition result;

a second division device configured to divide the acoustic model serialization code, the phonemic code, the sub-word unit, and the speech recognition result converted by the second conversion device;

a second speech retrieval unit creation device configured to create a second speech retrieval unit by using the acoustic model serialization code, the phonemic code, the sub-word unit, and the speech recognition result divided by the second division device as elements; and a matching device configured to match the first speech retrieval unit and the second speech retrieval unit so as to determine a matching degree between the input search term and the audio file, and determine a matching result according to the matching degree, wherein each of the acoustic model serialization codes includes searchable text obtained by serializing mel-frequency cepstrum coefficients with a vector quantization technique.

2. The speech retrieval apparatus according to claim 1, wherein:

the first division device is configured to further divide context information included in the audio file, the first speech retrieval unit creation device is configured to let the divided context information be an element of the first speech retrieval unit, the second speech retrieval unit creation device is configured to let the speech recognition result divided by the second division device be context information, and let the said context information be an element of the second speech retrieval unit.

3. The speech retrieval apparatus according to claim 1, wherein:

when the first conversion device converts the audio file in the speech database into the acoustic model serialization code, the phonemic code, the sub-word unit, and the speech recognition result, the first conversion device obtains time information of speech corresponding to the acoustic model serialization code, the phonemic code, the sub-word unit, and the speech recognition result at the same time, the first speech retrieval unit creation device is configured to add the corresponding time information of speech into the first speech retrieval unit, and let the corresponding time information of speech be information related to various elements of the first speech retrieval unit, the matching device is configured to add the corresponding time information of speech into the matching result, and output the matching result having the corresponding time information.

4. The speech retrieval apparatus according to claim 1, wherein:

the matching device is configured to rank the matching result according to the matching degree, and output the ranked matching result.

5. The speech retrieval apparatus according to claim 1, further comprising:

a model processing device configured to deal with the audio file in the speech database by using various acoustic models and various language models.

6. The speech retrieval apparatus according to claim 2, wherein:

the first division device is configured to determine time information of speech corresponding to the context information by using event time or annotated time included in the context information; if the context information does not have the event time or the annotated time, then the first division device lets the context information correspond to all time information of speech.

7. The speech retrieval apparatus according to claim 1, wherein:

in a case where the search term is a text search term, the second conversion device is configured to convert the text search term into a speech search term.

8. The speech retrieval apparatus according to claim 1, wherein:

the first division device is configured to divide the acoustic model serialization code, the phonemic code, the sub-word unit, and the speech recognition result converted by the first conversion device according to an equal-time division method, a speech energy division method, or a vowel-consonant division method, the second division device is configured to divide the acoustic model serialization code, the phonemic code, the sub-word unit, and the speech recognition result converted by the second conversion device according to the equal-time division method, the speech energy division method, or the vowel-consonant division method.

9. The speech retrieval apparatus according to claim 1, wherein the matching device comprises:

a matching element finding device configured to find matching elements in the first speech retrieval unit of the audio file in the speech database with regard to respective elements in the second speech retrieval unit;

a unit matching decision device configured to determine a unit matching result between the first speech retrieval unit and the second speech retrieval unit according to the matching elements in the first speech retrieval unit and the second speech retrieval unit as well as the weights of the matching elements;

a matching result decision device configured to determine the matching degree between the search term and the audio file according to the unit matching results between all of the second speech retrieval units of the search term and all of the first speech retrieval units of the audio file, determine whether the audio file and the search term match according to the matching degree, and let the matching audio file in the speech database be the matching result.

10. A speech retrieval method for searching, in a speech database, for an audio file matching an input search term, comprising:

a first conversion step for converting the audio file in the speech database into an acoustic model serialization code, a phonemic code, a sub-word unit, and a speech recognition result;

a first division step for dividing the acoustic model serialization code, the phonemic code, the sub-word unit, and the speech recognition result converted by the first conversion step;

a first speech retrieval unit creation step for creating a first speech retrieval unit by using the acoustic model serialization code, the phonemic code, the sub-word unit, and the speech recognition result divided by the first division step as elements;

a second conversion step for converting the input search term into an acoustic model serialization code, a phonemic code, a sub-word unit, and a speech recognition result;

a second division step for dividing the acoustic model serialization code, the phonemic code, the sub-word unit, and the speech recognition result converted by the second conversion step;

a second speech retrieval unit creation step for creating a second speech retrieval unit by using the acoustic model serialization code, the phonemic code, the sub-word unit, and the speech recognition result divided by the second division step as elements; and a matching step for matching the first speech retrieval unit and the second speech retrieval unit so as to determine a matching degree between the input search term and the audio file, and determining a matching result according to the matching degree, wherein each of the acoustic model serialization codes includes searchable text obtained by serializing mel-frequency cepstrum coefficients with a vector quantization technique.

\* \* \* \* \*